Patented June 24, 1930

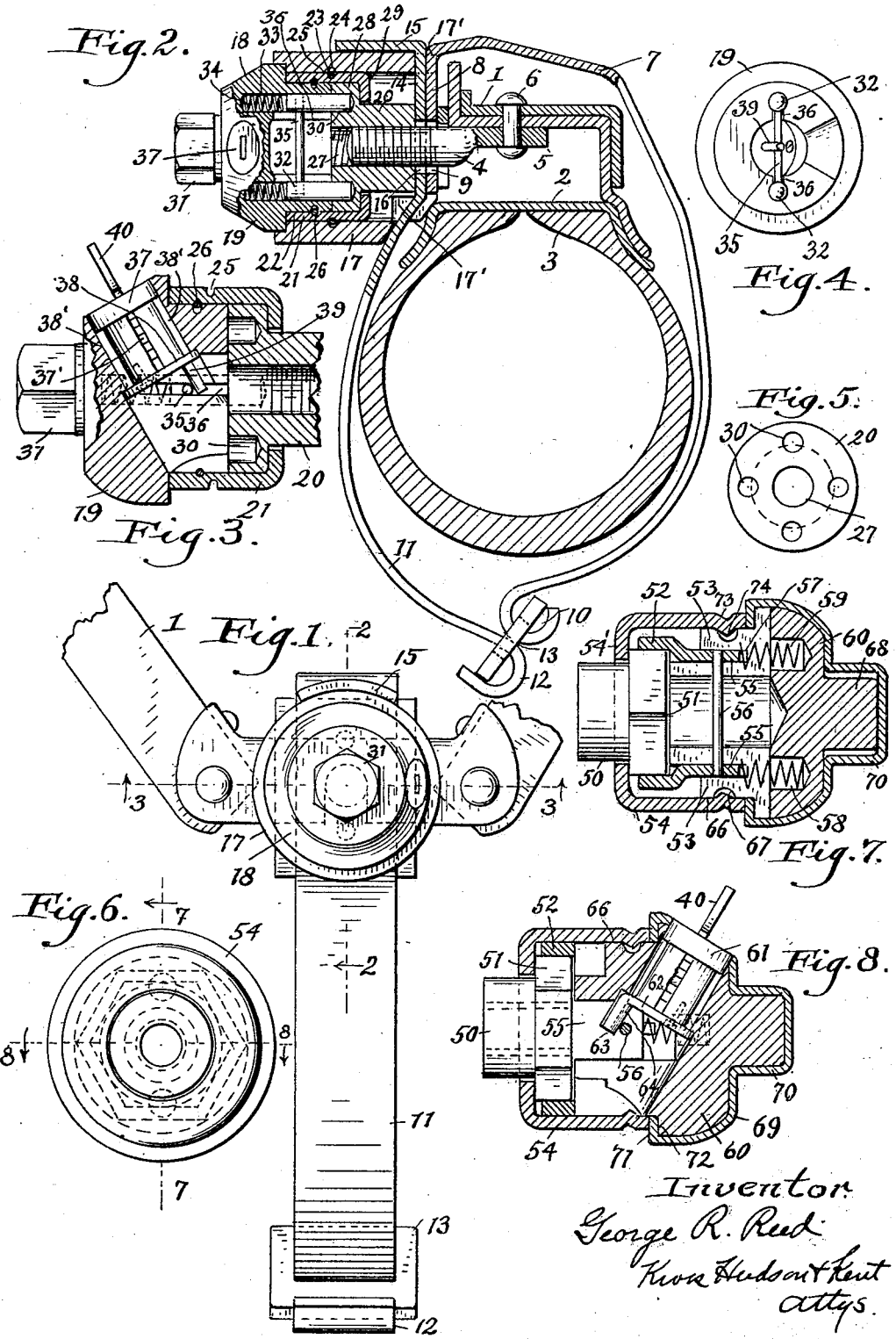

1,768,293

UNITED STATES PATENT OFFICE

GEORGE R. REED, OF CLEVELND, OHIO, ASSIGNOR TO THE EATON AXLE AND SPRING COMPANY, OF CLEVELAND, OHIO, A CORPORATION OF OHIO

SPARE-TIRE LOCK

Application filed October 10, 1928. Serial No. 311,482.

This invention relates to locking devices, and more particularly to a device for locking a spare tire and rim upon the spare tire carrier of a motor vehicle.

An object of this invention is to provide a spare tire locking device which can be readily applied to spare tire carriers, such as form a part of the standard equipment of motor vehicles.

Another object of this invention is to provide a reliable locking device which will effectively lock the spare tire as well as the spare rim upon which the tire is mounted.

With the above and other objects in view, the invention may be said to comprise the locking device, illustrated in the accompanying drawings hereinafter described, and particularly set forth in the appended claims, together with such variations and modifications thereof as will be apparent to one skilled in the art to which the invention appertains.

Reference should be had to the accompanying drawings forming a part of this specification in which:

Figure 1 is an elevational view showing the locking device applied to a spare tire carrier.

Figure 2 is a sectional view of the assembled device, taken on line 2—2 of Figure 1.

Figure 3 is a sectional view of the locking device on the line 3—3 of Figure 1.

Figure 4 is an elevational view of the inner end of the operating member.

Figure 5 is an end elevational view of the retaining member.

Figure 6 is an end elevational view of another form of locking device embodying my invention.

Figure 7 is a sectional view taken on line 7—7 of Fig. 6, showing another form of the device.

Figure 8 is a sectional view taken on line 8—8 of Fig. 6.

The locking device of the present invention is designed for use in connection with spare tire and spare rim carriers, such as form a part of the standard equipment of motor vehicles. As shown in Figures 1 and 2, the locking device may be applied directly to the spare tire carrier without necessitating any change or alteration in the standard spare tire carrying equipment. The spare tire carrier is represented generally at 1, and a spare rim 2, with a spare tire 3 thereon are shown mounted on the carrier. A threaded bolt or projection 4, having a flattened head 5, projects from the carrier for cooperation with means for retaining the spare tire and rim upon the carrier. The bolt 4 is rigidly secured to the carrier by means of rivets 6, which pass through the flattened head 5, the bolt thus serving as a fixed member to which the locking device is adapted to be applied. The arrangement thus far described constitutes a part of a typical example of the standard equipment with which motor vehicles are generally provided. A flat band 7 formed of hardened spring steel bent to conform to the shape of the carrier and tire, and having a straight inwardly projecting end part 8, is adapted to be applied to the carrier, with the threaded bolt 4 passing through an elongated opening 9 formed in the straight portion 8. At the opposite end of this band 7 there is formed a hook 10. A second curved band 11 cooperates with band 7 and together they form a tire and rim encircling member. This band 11 has a hook 12 formed at one end and straight portions 14 and 15 formed adjacent its opposite end. The hooks 10 and 12 are connected by a link 13 in such a way as to form a hinge. The straight end portion 14 of the band 11 has an elongated perforation 16, through which the threaded bolt 4 passes when the band 11 is swung up into tire encircling position.

A cylindrical member 17 serves as a housing for the lock mechanism, and has its walls slotted or recessed at one end at points which are diametrically opposite, as indicated at 17'. The straight portion 14 of the band 11 is arranged in these slots 17' and retained therein by welding or any other desirable means. The end portion 15 of the band 11 is bent down so as to lie along the peripheral surface of the housing 17, and to conform to the curvature thereof. Thus it will be seen that the housing 17 and the band 11 are rigidly secured together with the straight portion 14 of the band 11 forming the bottom of the housing. While it is not necessary for the successful operation of the device that housing 17 and band 11 be rigidly secured together, however, for convenience in using the device, I prefer this construction.

The lock mechanism, designated generally at 18, is rotatably mounted within the housing 17. The lock mechanism 18 comprises an operating member 19, a cylindrical nut or retaining member 20, and a cup-shaped collar 21 in which the retaining member 20 is seated, and which engages a reduced cylindrical portion 22 of the operating member 19. For the purpose of securing the housing 17 and collar 21 together in relatively rotatable arrangement, the outer periphery of the collar 21 has formed therein an annular groove 25, and in the inner periphery of the housing 17 there is formed annular groove 24 which registers with the groove 25. A ring shaped spring member 23 is compressed into the annular groove 25 as the unit 18 is slid into the housing 17, and when groove 25 registers with the groove 24 the ring expands so as to then engage both grooves and thus secure the parts together. A similar locking spring, designated 26, is provided between the operating member 19 and the collar 21, to secure these members together in relatively rotatable arrangement. The retaining member 20, which is, in effect, a nut, has an opening 27 therethrough, which is threaded to engage with the threaded bolt 4. The retaining member 20 is formed with an enlarged cylindrical end 28, which is retained within the collar 21 by means of the inturned flange 29 formed on the end of the collar. In the face of the enlarged portion 28 of the retaining member there is provided a plurality of recesses 30 arranged concentrically about the axis of the retaining member. The operating member is provided with a projection on one end, which assumes the shape of a hexagon nut 31. From the opposite end of the operating member slidable bolts 32 project. The bolts 32 are adapted to slide in recesses 33, in the inner ends of which coil springs 34 are housed for engagement with the inner ends of the bolts. The sliding bolts 32 are connected by means of a pin 35, so that the bolts will operate in unison. Slots 36 are provided to accommodate the passage of connecting pin 35, as bolts 32 slide in and out. The slidable bolts 32 are so spaced that they will engage in two of the recesses 30, of the retaining member 20, which are diametrically opposite each other.

A cylinder lock 37 is rotatably mounted in the operating member 19, with its axis intersecting the axis of the operating member. On the inner end of the cylinder lock is secured a plate 38, which prevents the withdrawal of cylinder lock 37 from member 19. This plate 38 carries an eccentrically mounted pin 39 which engages connecting pin 35 as the cylinder lock 37 is rotated by means of key 40, and thus retracts bolts 32 against the action of coil springs 34. When the bolts are in the retracted position, the springs 34 are compressed and the pawls 37' of cylinder lock 37 are in alignment with one of the slots 38' formed in member 19. Upon withdrawing the key 40 the pawls 37' are projected radially outwardly into one of the slots 38' locking the cylinder lock against rotation while the key is withdrawn.

It will now be readily apparent that by insertion of the key 40, the pawls 37' will be retracted, thus freeing cylinder lock 37 and eccentric pin 39 for rotation, which will permit compressed springs 34 to force the sliding bolts 32 outwardly to engage in the recesses 30 provided in the retaining member 20, and thus connect retaining member 20 and operating member 19 for rotation together within the housing 17, so that by turning operating member 19, the retaining member 20 can be screwed on or off the threaded bolt 4.

Another form which the locking mechanism of this invention may assume is shown in Figures 6, 7 and 8. In this arrangement a retaining member 50 is provided with a hexagon shaped head 51, which is adapted to be engaged by a slidable hexagon shaped sleeve or socket 52. The retaining member 50, having an opening centrally therethrough, which is threaded for engagement with threaded bolt 4, is retained within the cup-shaped collar 54 by means of the inturned flange 54'. On the end of sleeve member 52 opposite the hexagon shaped socket there are formed diametrically opposite lugs 55, which slidably engage in slots 53 of member 60. A pin 56 connects lugs 55 and has an end fixedly mounted in each lug. The free ends of the lugs 55 terminate in reduced projections 57, which serve as centering means for the compression springs 58 which are seated in recesses 59 of member 60.

Rotatably mounted in member 60 is a cylinder lock 61, positioned so that its axis will intersect the axis of member 60. On the inner end of cylinder lock 61 is carried a plate 62, having an eccentric lug 63 formed integral therewith. The plate 62 prevents the cylinder lock 61 from being withdrawn from the member 60. The lug 63 is formed by making the plate 62 with a peripheral extension, and then bending over this extension to a position at right angles with the plane of the plate. This projection 63 is curved so that the curved surface 64 will be in rolling engagement with the pin 56 with which lug 63 engages. Thus it will be seen that by manipulation of the key 40, the cylinder lock 61 can be rotated to bring eccentric lug 63 into engagement with pin 56, to thereby cause the sleeve 52 to move longtiudinally along its axis to compress springs 58 and to disengage the hexagon head 51 of the retaining member 50. The inner end of member 60 is formed with a reduced cylindrical portion 66, in which a peripheral groove 67 is formed. On the opposite end of member 60 there is provided a hexagon shaped extension 68. A cover member 69 having a hexagon shaped recess 70 is adapted to fit over and encompass member 60. This cover member 69 is provided with a flange 71, which when spun or pressed down against the shoulder 72 of the member 60 serves to maintain the cover 69 in place over member 60. A peripheral groove 73 is rolled or otherwise formed in the cylindrical portion of the cup-shaped collar 54. When this peripheral groove is rolled into the member 54 it causes a projection 74 to be formed on the inner periphery of the collar 54, and this projection 74 engages in the annular groove 67 formed in the member 60. The annular projection 74 and the annular groove 67 thus serve to retain the parts of the locking mechanism in assembled position, as shown in Figures 7 and 8. Annular groove 73 further serves to cooperate with a peripheral groove similar to groove 24, shown in Fig. 1, to retain the locking mechanism within the housing member 17 in relatively rotatable arrangement.

The operation of the device is as follows:

Spare rim 2 with tire 3 mounted thereon is placed in position on carrier 1, and the locking device is swung up with hook 12 and link 13 serving as a hinging point, thus bringing the threaded opening 27 of retaining member 20 into alignment with threaded bolt 4. By applying a wrench or similar tool to the hexagon headed extension 31 the operating member 19 may be rotated within the housing 17 and rotation will thereby be imparted to retaining member 20 by means of the sliding bolts 32 engaged in the recess 30 thereof. Upon rotation of retaining member 20, the threaded opening 27 thereof will engage with the threads of bolt 4 and draw the locking device into position with straight portion 14 of band 11 bearing against straight portion 8 of band 7, and with housing 17 bearing against the spare rim 2. When the operating member has thus been turned sufficiently to tighten the member 20 and force the flattened portion 14 of the band 11 against the flat portion 8 of the band 7, key 40 is turned to thereby impart rotation to the cylinder lock 37 and the eccentric pin 39 which is thereby caused to engage connecting pin 35 and retract sliding bolts 32 from the recesses 30 of the retaining member 20 against the action of the coil springs 34. When the sliding bolts are thus retracted the operating member 19 is free to rotate within the housing 17 without imparting rotation to the retaining member 20. When the key is withdrawn the device will then be in locked position with housing 17 bearing against the rim 2 and bands 7 and 11 encircling the tire and rim.

The operation of the locking unit shown in Figs. 6, 7 and 8 is essentially the same as the operation of the unit shown in Fig. 2 and, therefore, need not be repeated.

In connection with both forms of the device it is to be noted that by providing housing 17 with slots 17' in the walls at one end of the housing, the flat portions 14 and 8 of the bands 11 and 7, respectively, will both lie within these slots 17' when the parts are in locked position. The portions of the wall of the cylindrical housing 17 which thus overlap the portions 14 and 8 of the encircling bands prevent the insertion of a hack saw blade or other tool between the flat portions 8 and 14, for the purpose of severing the bolt 4. Furthermore, the device as shown does not present any portion by which it can be grasped securely enough to shear or twist the bolt 4 from the carrier.

Having thus described my invention, I claim:

1. In a locking device, the combination of a housing, a retaining member rotatably mounted in said housing and adapted to engage a fixed member, an operating member rotatably mounted in said housing, means for retaining said operating member and said retaining member in said housing, means movable to connect said operating member and said retaining member for rotation together to thereby effect engagement between said fixed member and said retaining member, and key controlled means mounted in said operating member for actuating said movable means, said key controlled means being positioned with its axis inclined to the axis of said operating member.

2. In a locking device, the combination of a housing, a retaining member rotatably mounted in said housing and adapted to engage a fixed member, an operating member rotatably mounted in said housing, means for retaining said operating member and said retaining member in said housing, means movable to connect said operating member and said retaining member for rotation together to thereby effect engagement between said fixed member and said retaining member, a member extending transversely of said movable means, key controlled means mounted in said operating member with its axis inclined to the axis of said movable means, and a projection eccentrically carried by said key controlled means and engageable with said transversely extending member for actuating said movable means.

In testimony whereof, I hereunto affix my signature.

GEORGE R. REED.